US008309652B2

(12) United States Patent
Morita et al.

(10) Patent No.: US 8,309,652 B2
(45) Date of Patent: *Nov. 13, 2012

(54) CURABLE SILICONE COMPOSITION AND CURED PRODUCT THEREFROM

(75) Inventors: Yoshitsugu Morita, Ichihara (JP); Minoru Isshiki, Otsu (JP); Hiroshi Ueki, Ichihara (JP)

(73) Assignee: Dow Corning Toray Company, Ltd., Chiyoda-ku, Tokyo (JP)

(*) Notice: Subject to any disclaimer, the term of this patent is extended or adjusted under 35 U.S.C. 154(b) by 462 days.

This patent is subject to a terminal disclaimer.

(21) Appl. No.: 11/912,631

(22) PCT Filed: Apr. 27, 2006

(86) PCT No.: PCT/JP2006/309218
§ 371 (c)(1),
(2), (4) Date: Jan. 7, 2009

(87) PCT Pub. No.: WO2006/118334
PCT Pub. Date: Nov. 9, 2006

(65) Prior Publication Data
US 2009/0247681 A1 Oct. 1, 2009

(30) Foreign Application Priority Data
Apr. 27, 2005 (JP) .................. 2005-129441

(51) Int. Cl.
*C08L 83/04* (2006.01)
(52) U.S. Cl. ........... 524/588; 524/440; 525/477; 528/43
(58) Field of Classification Search ............ 528/43; 524/440
See application file for complete search history.

(56) References Cited

U.S. PATENT DOCUMENTS

| | | | |
|---|---|---|---|
| 4,604,424 A | 8/1986 | Cole et al. | |
| 4,833,226 A * | 5/1989 | Ishimura et al. | 528/45 |
| 5,008,307 A | 4/1991 | Inomata | |
| 5,021,494 A | 6/1991 | Toya | |
| 5,618,631 A | 4/1997 | Meguriya et al. | |
| 5,645,941 A | 7/1997 | Meguriya et al. | |
| 5,714,265 A | 2/1998 | Meguriya et al. | |
| 5,804,631 A * | 9/1998 | Mine et al. | 524/440 |
| 5,859,127 A | 1/1999 | Nakano et al. | |
| 5,891,969 A * | 4/1999 | Mine et al. | 525/476 |
| 6,025,435 A | 2/2000 | Yamakawa et al. | |
| 6,235,862 B1 | 5/2001 | Isshiki et al. | |
| 6,306,957 B1 | 10/2001 | Nakano et al. | |
| 6,380,301 B1 | 4/2002 | Enami et al. | |
| 6,639,008 B2 * | 10/2003 | Lewis et al. | 524/588 |
| 6,709,753 B2 * | 3/2004 | Honda et al. | 428/447 |
| 7,501,183 B2 * | 3/2009 | Hara et al. | 428/447 |
| 2002/0028335 A1 | 3/2002 | Fujiki et al. | |
| 2003/0010962 A1 * | 1/2003 | Kuwabara et al. | 252/573 |
| 2003/0100669 A1 * | 5/2003 | Lewis et al. | 524/588 |
| 2003/0212230 A1 | 11/2003 | Rubinsztajn et al. | |
| 2005/0080204 A1 * | 4/2005 | Furukawa et al. | 525/477 |
| 2007/0225437 A1 * | 9/2007 | Morita et al. | 524/862 |

FOREIGN PATENT DOCUMENTS

| | | |
|---|---|---|
| EP | 1002834 | 5/2000 |
| EP | 1403326 | 3/2004 |
| GB | 2279616 | 1/1995 |
| JP | 61-157569 | 7/1986 |
| JP | 62-184058 | 8/1987 |
| JP | 63-251466 | 10/1988 |
| JP | 2041362 | 2/1990 |
| JP | 2097559 | 4/1990 |
| JP | 06-306084 | 11/1994 |
| JP | 07-022441 | 1/1995 |
| JP | 07-118365 | 5/1995 |
| JP | 07-161740 | 6/1995 |
| JP | 08-176447 | 7/1996 |
| JP | 08-325457 | 12/1996 |
| JP | 09-095651 | 4/1997 |
| JP | 10-130465 | 5/1998 |
| JP | 10-147764 | 6/1998 |
| JP | 10-163232 | 6/1998 |
| JP | 11-012546 | 1/1999 |
| JP | 2000-256558 | 9/2000 |
| JP | 2001 139815 | 5/2001 |
| JP | 2002-371184 * | 12/2002 |
| JP | 2004-043814 | 2/2004 |
| JP | 2004-043815 | 2/2004 |
| WO | WO 02/097393 | 12/2002 |
| WO | WO 2004/041938 | 5/2004 |
| WO | WO 2004/072181 | 8/2004 |
| WO | WO 2005/021652 | 3/2005 |
| WO | WO 2005/044920 * | 5/2005 |
| WO | WO 2005044920 A1 * | 5/2005 |

OTHER PUBLICATIONS

CRC Handbook of Chemistry and Physics.*
Cotton, F.A., Wilkinson, G. Advanced Inorganic Chemistry. New York: John Wiley & Sons, 1966.*
Computer translation of JP 2002-371184 (Dec. 2002) into the English language.*
English language abstract for JP 2041362 extracted from espacenet.com database dated Feb. 23, 2008.

(Continued)

Primary Examiner — Marc Zimmer
(74) Attorney, Agent, or Firm — Howard & Howard Attorneys PLLC

(57) ABSTRACT

A curable silicone composition comprising: (A) an organopolysiloxane that is represented by the average unit formula: $(R^1{}_3SiO_{1/2})_a(R^2{}_2SiO_{2/2})_b(R^3SiO_{3/2})_c(SiO_{4/2})_d$ (wherein $R^1$, $R^2$, and $R^3$ are each independently selected from substituted or unsubstituted monovalent hydrocarbon groups and epoxy-functional monovalent organic groups, with the proviso that at least 20 mole % of $R^3$ are aryl groups, and a, b, c, and d are numbers that satisfy $0 \leq a \leq 0.8$, $0 \leq b \leq 0.8$, $0.2 \leq c \leq 0.9$, $0 \leq d < 0.8$, and a+b+c+d=1), and that has at least two of the aforementioned epoxy-functional monovalent organic groups in each molecule; (B) a compound that has a group capable of reacting with the epoxy group; (C) a cure accelerator; and (D) a thermally conductive filler, has excellent handling characteristics and that cures rapidly to give a cured product that is highly thermally conductive, very flexible, highly adhesive, and very flame retardant.

17 Claims, No Drawings

OTHER PUBLICATIONS

English language abstract for JP 2097559 extracted from espacenet.com database dated Feb. 23, 2008.
English language translation and abstract for JP06-306084 extracted from *Searching PAJ* database dated Jan. 1, 2008, 31 pages.
English language translation and abstract for JP07-022441 extracted from *Searching PAJ* database dated Jan. 1, 2008, 15 pages.
English language translation and abstract for JP07-118365 extracted from *Searching PAJ* database dated Jan. 1, 2008, 16 pages.
English language translation and abstract for JP07-161740 extracted from *Searching PAJ* database dated Jan. 1, 2008, 15 pages.
English language translation and abstract for JP08-176447 extracted from *Searching PAJ* database dated Dec. 9, 2007, 28 pages.
English language abstract for JP 8325457 extracted from espacenet.com database dated Feb. 23, 2008.
English language translation and abstract for JP09-095651 extracted from *Searching PAJ* database dated Jan. 1, 2008, 15 pages.
English language translation and abstract for JP10-130465 extracted from *Searching PAJ* database dated Jan. 1, 2008, 12 pages.
English language translation and abstract for JP10-147764 extracted from *Searching PAJ* database dated Jan. 1, 2008, 14 pages.
English language translation and abstract for JP10-163232 extracted from *Searching PAJ* database dated Jan. 1, 2008, 16 pages.
English language abstract for JP 11012546 extracted from espacenet.com database dated Jan. 19, 1999.
English language abstract for JP 61157569 extracted from espacenet.com database dated Jul. 17, 1986.
English language abstract for JP 62184058 extracted from espacenet.com database dated Feb. 23, 2008.
English language abstract for JP 63251466 extracted from espacenet.com database dated Feb. 23, 2008.
English language abstract for JP 2000256558 extracted from espacenet.com database dated Feb. 23, 2008.
English language abstract for JP 2001139815 extracted from espacenet.com database dated Feb. 23, 2008.
English language translation and abstract for JP2004-043814 extracted from *Searching PAJ* database dated Dec. 16, 2007, 51 pages.
English language translation and abstract for JP2004-043815 extracted from *Searching PAJ* database dated Dec. 9, 2007, 17 pages.
PCT International Search Report for PCT/JP2005/011864, Jan. 20, 2006, 5 pages.
PCT International Search Report for PCT/JP2005/018405, Mar. 22, 2006, 6 pages.
PCT International Search Report for PCT/JP2005/024196, Mar. 20, 2006, 3 pages.
PCT International Search Report for PCT/JP2005/306996, Jul. 18, 2006, 3 pages.
PCT International Search Report for PCT/JP2005/307001, Jul. 13, 2006, 3 pages.
Yongxin Han et al. "Silicon Directed *ipso*-Substitution of Polymer Bound Arylsilanes: Preparation of Biaryls via", Tetrahedron Letters, vol. 37, No. 16. 1996, pp. 2703-2706.
Schultz et al., "The Synthesis of Trimethylsilylmethoxymethyl Chloride", OPPI Briefs, vol. 27, No. 5, 1995, pp. 572-574.
Hojo et al., "New Access to Carbonyl Ylides by the Silicon-Based 1,3-Elimination and Their:..", Tetrahedron Letters, vol. 34, No. 37, 1993, pp. 5943-5946.
Boons et al., "Use of (Phenyldimethylsilyl)methoxymethyl and (Phenyldimethylsilyl)methyl ethers . . . ", Tetrahedron Letters, vol. 31, No. 15, 1990, pp. 2197-2200.
Hasseberg et al., "104. Synthese von Orellin", Helvetica Chimica Acta—vol. 71, No. 5, 1988, pp. 957-963.
Guedin-Vuong et al., "An Easy Access to Homopropargylic Ethers", Bulletin De La Societe Chimique De France, No. 2, 1986, pp. 245-252.
Pyne et al., "Chiral and Stereochemical Control via Intramolecular Diels-Alder Reaction of Z Dienes", J. American Chemical Society, vol. 104, No. 21, 1982, pp. 5719-5728.
Lipshutz et al., "B-(Trimethylylsily1) Ethoxymethyl Chloride . . . ," Tetrahedron Letters, vol. 21, No. 35, 1980, pp. 3343-3346.
Shikhiev et al., "Synthesis and Reactions of Unsaturated Organosilicon Compounds", J. of General Chemistry of the USSR, vol. 41, No. 3, 1971, pp. 617-619.
Shipov et al., "Synthesis of Alkyl Chloromethyl Ethers", J. of General Chemistry of the USSR, vol. 59, No. 5.2, 1989, p. 1067.
Miramon et al., "Short Synthesis of Polyoxygenated Macrocyclic . . . ", Journal of Organic Chemistry, vol. 69, No. 20, 2004, pp. 6949-6952.
Shikhiev et al., "Synthesis and Reactions of Some Heteroorganic Ethers . . . ", J. of General Chemistry of the USSR, vol. 45, No. 1, 1975, pp. 91-93.

* cited by examiner

CURABLE SILICONE COMPOSITION AND CURED PRODUCT THEREFROM

RELATED APPLICATIONS

This application claims priority to and all the advantages of International Patent Application No. PCT/JP2006/309218, filed on Apr. 27, 2006, which claims priority to Japanese Patent Application No. JP2005-129441, filed on Apr. 27, 2005.

TECHNICAL FIELD

The present invention relates to a curable silicone composition and to a cured product therefrom. The present invention more particularly relates to a curable silicone composition that has excellent handling characteristics and that cures rapidly to give a cured product that is highly thermally conductive, very flexible, highly adhesive, and very flame retardant. The present invention also more particularly relates to a cured product that is highly thermally conductive, very flexible, and very flame retardant.

BACKGROUND ART

There have been investigations into the incorporation of thermally conductive filler into the curable epoxy resin compositions used as sealants and adhesives for electrical/electronic components and into the utilization of the resulting compositions as adhesives for bonding a heat source, such as a semiconductor chip, to a heat sink member. The cured products from such compositions, however, have had a high modulus and have been stiff, which has quite readily resulted in the generation of large stresses on the electrical/electronic component, such as a semiconductor chip, due to thermal expansion of the cured material. This has resulted in problems such as warping of the electrical/electronic component or substrate, the appearance of cracks in the cured product itself, the generation of gaps between the electrical/electronic component and the cured product, and even in failure of the electrical/electronic component. Moreover, while this cured product needs to be flame retardant, the flame retardancy has been inadequate.

In order to reduce the stress associated with the cured product, die-attach pastes comprising epoxy resin and the reaction product of cyanate resin with an epoxy-functional dimethylsiloxane compound (refer to Japanese Laid-Open (Unexamined) Patent Application Numbers Hei 10-147764 (147,764/1998) and Hei 10-163232 (163,232/1998)) and die-bonding agents comprising the reaction product of epoxy-functional silicone oil and a phenolic organic compound (refer to Japanese Laid-Open (Unexamined) Patent Application Numbers Hei 7-22441 (22,441/1995), Hei 7-118365 (118,365/1995), and Hei 10-130465 (130,465/1998)) have been introduced. However, the cured products afforded by these materials are still stiff and the stress-reducing effect is inadequate.

In another vein, curable silicone compositions provide cured products that have excellent electrical characteristics, e.g., dielectric characteristics, volumetric resistivity, and dielectric breakdown strength, and for this reason are used as sealants and adhesives for electrical/electronic components. However, they yield cured products that are, conversely, soft and that have a low mechanical strength and a low modulus, and this has resulted in a poor capacity to protect electrical/electronic components, that is, a poor performance with regard to protecting electrical/electronic components from external impact or shock. In addition, these cured products, because they exhibit low adhesiveness for electrical/electronic components, have been associated with the facile generation of gaps between the cured product and these components. While there have been attempts at improving the modulus and mechanical strength of the cured product by incorporating filler into the curable silicone composition, this results in a loss of the softness and flexibility. The generation of thermal conductivity through the incorporation of metal powder (e.g., silver, copper, and so forth) into curable silicone compositions has been studied, but this approach results in a low flame retardancy by the cured material thereby afforded.

Japanese Laid-Open (Unexamined) Patent Application Number Hei 6-306084 (306,084/1994) discloses a curable silicone composition that has a short gelation time; this curable silicone composition comprises epoxy-modified silicone oil and phenol-modified silicone oil. This curable silicone composition, however, exhibits a poor curability and requires a lengthy period of heating for cure. In addition, it generates a very brittle cured product.

It is an object of the present invention to provide a curable silicone composition that has excellent handling characteristics and that cures rapidly to give a cured product that is highly thermally conductive, very flexible, highly adhesive, and very flame retardant. It is a further object of the present invention is to provide a cured product that is highly thermally conductive, very flexible, and very flame retardant.

DISCLOSURE OF INVENTION

The curable silicone composition of the present invention comprises:
(A) an organopolysiloxane that is represented by the average unit formula:

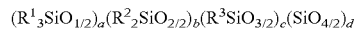

$(R^1{}_3SiO_{1/2})_a(R^2{}_2SiO_{2/2})_b(R^3SiO_{3/2})_c(SiO_{4/2})_d$ (wherein $R^1$, $R^2$, and $R^3$ are each independently selected from substituted or unsubstituted monovalent hydrocarbon groups and epoxy-functional monovalent organic groups, with the proviso that at least 20 mole % of $R^3$ are aryl groups, and a, b, c, and d are numbers that satisfy $0 \leq a \leq 0.8$, $0 \leq b \leq 0.8$, $0.2 \leq c \leq 0.9$, $0 \leq d < 0.8$, and $a+b+c+d=1$), and that has at least two of the aforementioned epoxy-functional monovalent organic groups in each molecule;
(B) a compound that has a group capable of reacting with the epoxy group;
(C) a cure accelerator; and
(D) a thermally conductive filler.

The cured product of the present invention is characteristically afforded by cure of the composition described above.

EFFECTS OF INVENTION

The curable silicone composition of the present invention characteristically has excellent handling characteristics and cures rapidly to give a cured product that is highly thermally conductive, very flexible, highly adhesive, and very flame retardant. The cured product of the present invention is characterized by an excellent thermal conductivity, an excellent flexibility, and an excellent flame retardancy.

DETAILED DESCRIPTION OF THE INVENTION

The curable silicone composition of the present invention will be described in detail first.

Component (A), which is a main component of the composition, is organopolysiloxane represented by the average unit formula:

$$(R^1{}_3SiO_{1/2})_a(R^2{}_2SiO_{2/2})_b(R^3SiO_{3/2})_c(SiO_{4/2})_d$$

$R^1$, $R^2$, and $R^3$ in this formula are each independently selected from substituted or unsubstituted monovalent hydrocarbon groups and epoxy-functional monovalent organic groups. The subject monovalent hydrocarbon groups can be exemplified by alkyl groups such as methyl, ethyl, propyl, butyl, pentyl, and so forth; alkenyl groups such as vinyl, allyl, butenyl, pentenyl, hexenyl, and so forth; aryl groups such as phenyl, tolyl, xylyl, and so forth; aralkyl groups such as benzyl, phenethyl, and so forth; and halogenated alkyl groups such as chloromethyl, 3,3,3-trifluoropropyl, and so forth. Alkyl groups and aryl groups are preferred, and methyl and phenyl are particularly preferred. The epoxy-functional monovalent organic groups can be exemplified by glycidoxyalkyl groups such as 2-glycidoxyethyl, 3-glycidoxypropyl, 4-glycidoxybutyl, and so forth; epoxycycloalkylalkyl groups such as 2-(3,4-epoxycyclohexyl)ethyl, 3-(3,4-epoxycyclohexyl)propyl, 2-(3,4-epoxy-3-methylcyclohexyl)-2-methylethyl, and so forth; and oxiranylalkyl groups such as 4-oxiranylbutyl, 8-oxiranyloctyl, and so forth. Glycidoxyalkyl groups and epoxycycloalkylalkyl groups are preferred, and 3-glycidoxypropyl and 2-(3,4-epoxycyclohexyl)ethyl are particularly preferred.

At least 20 mol % of the $R^3$ in the preceding formula must be aryl groups, and preferably at least 50 mol % and particularly preferably at least 80 mol % are aryl groups. Problems such as a decline in the compatibility with component (B), a decline in the adhesiveness of the resulting composition, and a decline in the mechanical strength of the ultimately obtained cured product occur when the proportion of aryl groups in $R^3$ is below the lower limit of the given range. Phenyl is particularly preferred for the aryl groups encompassed by $R^3$.

a, b, c, and d in the preceding formula are numbers that satisfy the following: $0 \leq a \leq 0.8$, $0 \leq b \leq 0.8$, $0.2 \leq c \leq 0.9$, $0 \leq d < 0.8$, and a+b+c+d=1. a is a number that represents the proportion of the $R^1{}_3SiO_{1/2}$ siloxane unit in component (A). When component (A) is composed of only the $R^3SiO_{3/2}$ siloxane unit, its viscosity becomes elevated and the handling characteristics of the resulting composition deteriorate, and for this reason a is a number preferably satisfying $0 \leq a \leq 0.8$ and more preferably $0.3 \leq a \leq 0.8$. b is a number that represents the proportion of the $R^2{}_2SiO_{2/2}$ siloxane unit in component (A) and preferably is a number satisfying $0 \leq b \leq 0.6$ because this impedes outmigration of component (A) from the resulting cured product at suitable molecular weights and also yields cured product with an excellent mechanical strength. c is a number that represents the proportion of the $R^3SiO_{3/2}$ siloxane unit in component (A) and is preferably a number satisfying $0.4 \leq c \leq 0.9$ because this provides the instant composition with good handling characteristics and a good adhesiveness and provides the cured product therefrom with a good mechanical strength and a good flexibility. d is a number that represents the proportion of the $SiO_{4/2}$ siloxane unit in component (A) and is preferably $0 \leq d < 0.2$ because this provides the composition with good handling characteristics and a good adhesiveness and provides the cured product therefrom with a good mechanical strength and a good flexibility.

Component (A) must have at least two of the aforementioned epoxy-functional monovalent organic groups in each molecule. While the content of epoxy-functional monovalent organic group in component (A) is not otherwise specifically limited, the epoxy equivalent weight of component (A) (the value afforded by dividing the mass-average molecular weight of component (A) by the number of epoxy groups in the molecule) is preferably in the range from 100 to 2,000, is more preferably in the range from 100 to 1,000, and particularly preferably is in the range from 100 to 700. The flexibility of the cured product declines when the epoxy equivalent weight is below the lower limit on the aforementioned range, while exceeding the upper limit on this range results in a decline in the adhesiveness and curability of the resulting composition and in a decline in the mechanical strength of the cured product. Component (A) may be a single organopolysiloxane or a mixture of two or more organopolysiloxanes. The state of component (A) at 25° C. is not critical, and it can be, for example, a liquid or solid. Solid component (A) can be mixed to homogeneity with the other components through the use of an organic solvent or by heating. Component (A) is preferably a liquid at 25° C. because this provides a good blendability with the other components and provides good handling characteristics. The mass-average molecular weight of component (A) is not critical, but is preferably in the range of 500 to 10,000 and particularly preferably is in the range of 750 to 3,000.

The following organopolysiloxanes are examples of component (A). a, b, c, and d in these formulas are defined as above, except that a and b in the following formulas are not zero. e and f in these formulas are numbers that satisfy the following conditions: $0.1 < e < 0.8$, $0 < f < 0.2$, $0.2 \leq e+f \leq 0.9$, and $0.2 \leq e/(e+f)$. X in the following formulas represents 3-glycidoxypropyl and Y represents 2-(3,4-epoxycyclohexyl)ethyl.

$[X(CH_3)_2SiO_{1/2}]_a[C_6H_5SiO_{3/2}]_c$ $[Y(CH_3)_2SiO_{1/2}]_a[C_6H_5SiO_{3/2}]_c$ $[X(CH_3)_2SiO_{1/2}]_a[(CH_3)_2SiO_{2/2}]_b[C_6H_5SiO_{3/2}]_c$ $[Y(CH_3)_2SiO_{1/2}]_a[(CH_3)_2SiO_{2/2}]_b[C_6H_5SiO_{3/2}]_c$ $[XCH_3SiO_{2/2}]_b[C_6H_5SiO_{3/2}]_c$ $[YCH_3SiO_{2/2}]_b[C_6H_5SiO_{3/2}]_c$ $[X(CH_3)_2SiO_{1/2}]_a[C_6H_5SiO_{3/2}]_e[CH_3SiO_{3/2}]_f$ $[Y(CH_3)_2SiO_{1/2}]_a[C_6H_5SiO_{3/2}]_e[CH_3SiO_{3/2}]_f$ $[C_6H_5SiO_{3/2}]_e[XSiO_{3/2}]_f$ $[C_6H_5SiO_{3/2}]_e[YSiO_{3/2}]_f$

The method for preparing component (A) is not critical and can be exemplified by the following methods: the co-hydrolysis and condensation reaction of phenyltrialkoxysilane and alkoxysilane having an epoxy-functional monovalent organic group, e.g., 3-glycidoxypropyltrimethoxysilane or 2-(3,4-epoxycyclohexyl)ethyltrimethoxysilane; the alcohol-eliminating condensation reaction of the aforementioned alkoxysilane having an epoxy-functional monovalent organic group with a silanol-functional organopolysiloxane prepared by the hydrolysis and condensation of phenyltrichlorosilane or phenyltrialkoxysilane; a hydrosilylation reaction between olefin having an epoxy-functional monovalent organic group and SiH-functional organopolysiloxane prepared by co-hydrolysis and condensation of phenyltrichlorosilane or phenyltrialkoxysilane in the presence of an SiH-functional silane such as dimethylchlorosilane; an equilibration reaction in the presence of a base catalyst between (i) organopolysiloxane prepared by the hydrolysis and condensation of phenyltrichlorosilane or phenyltrialkoxysilane and (ii) trimethylsiloxy-endblocked methyl(3-glycidoxypropyl)siloxane-dimethylsiloxane copolymer or trimethylsiloxy-endblocked methyl{2-(3,4-epoxycyclohexyl)ethyl}siloxane-dimethylsiloxane copolymer; an equilibration reaction in the presence of a base catalyst between organopolysiloxane comprising the $C_6H_5SiO_{3/2}$ siloxane unit and cyclic methyl(3-glycidoxypropyl)siloxane or cyclic methyl{2-(3,4-epoxycyclohexyl)ethyl}siloxane; and an equilibration reaction in the presence of an acid or base catalyst among organopolysiloxane comprising the $C_6H_5SiO_{3/2}$ siloxane unit and cyclic methyl(3-glycidoxypropyl)siloxane or cyclic methyl{2-(3,4-epoxycyclohexyl)ethyl}siloxane and cyclic dimethylsiloxane.

Component (B), which is a compound that contains a group capable of reacting with the epoxy group, reacts with the epoxy groups in component (A) to bring about curing of the composition. This group capable of reacting with the epoxy group can be exemplified by the primary amino group, secondary amino group, hydroxyl group, phenolic hydroxyl group, carboxylic acid group, acid anhydride group, mercapto group, and silanol group. The phenolic hydroxyl group is preferred from the standpoint of reactivity and pot life. Component (B) can be specifically exemplified by phenol compounds such as phenol-novolac resins, cresol-novolac resins, bisphenol A compounds, and so forth, and by phenolic hydroxyl-functional organosiloxanes. Phenolic hydroxyl-functional organosiloxanes are preferred, and organosiloxane containing at least two phenolic hydroxyl groups in each molecule is particularly preferred. The phenol equivalent weight of component (B) (the value afforded by dividing the mass-average molecular weight of component (B) by the number of phenolic hydroxyls in a single molecule) is preferably not more than 1,000 and particularly preferably is not more than 500 for the high reactivity.

The phenolic hydroxyl-functional organosiloxane encompassed by component (B) is preferably organosiloxane with the general formula:

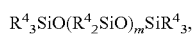

because this can improve the flexibility of the cured product from the composition. Each $R^4$ in this formula is independently selected from substituted or unsubstituted monovalent hydrocarbon groups and phenolic hydroxyl-functional monovalent organic groups. This monovalent hydrocarbon groups can be exemplified by the same groups as provided above, and preferably is alkyl groups or aryl groups and particularly preferably is methyl or phenyl. The phenolic hydroxyl-functional organic groups can be exemplified by the groups presented below. At least two of the $R^4$ in each molecule are phenolic hydroxyl-functional organic groups. $R^5$ in the structures is a divalent organic group and can be specifically exemplified by alkylene groups such as ethylene, methylethylene, propylene, butylene, pentylene, and hexylene; and by alkylenoxyalkylene groups such as ethylenoxyethylene, ethylenoxypropylene, ethylenoxybutylene, and propylenoxypropylene, wherein alkylene groups are preferred and propylene is particularly preferred.

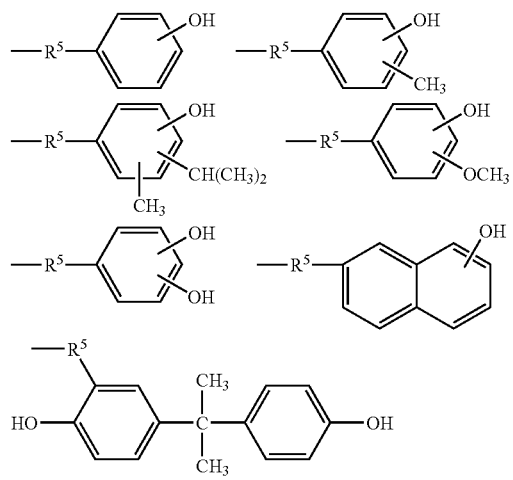

m in the preceding formula is an integer from 0 to 1,000 and preferably is an integer from 0 to 100 and particularly preferably is an integer from 0 to 20. When m exceeds the upper limit on this range, the handling characteristics decline, the blendability into component (A) declines, and dilution of the resulting composition with, for example, organic solvent, may also be necessary.

The organosiloxane encompassed by component (B) can be exemplified by the organosiloxanes provided below. x in the formulas is an integer from 1 to 20 and y is an integer from 2 to 10.

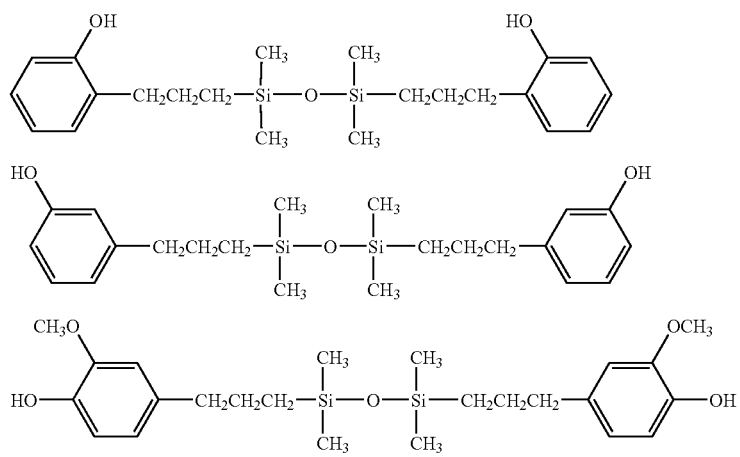

-continued

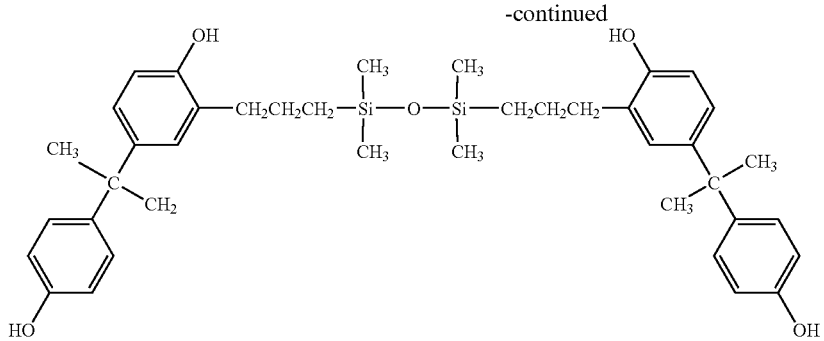

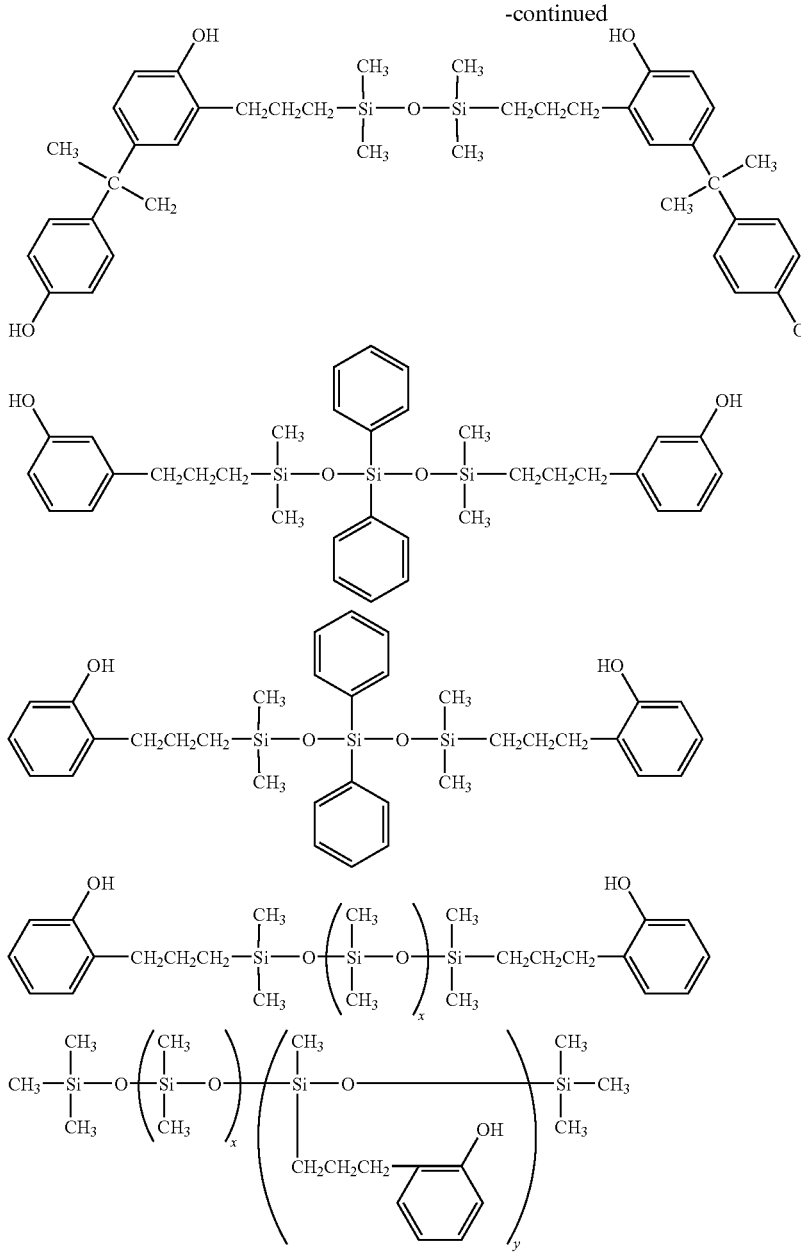

The method for preparing component (B) is not critical and can be exemplified by a hydrosilylation reaction between an alkenyl-functional phenol compound and SiH-functional organopolysiloxane.

The state of component (B) at 25° C. is not critical and component (B) can be a liquid or solid; however, it is preferably a liquid for the ease of handling this provides. When component (B) is a liquid at 25° C., its viscosity is preferably in the range of 1 to 1,000,000 mPa·s and particularly preferably is in the range of 10 to 5,000 mPa·s. The mechanical strength of the cured product declines when the viscosity at 25° C. falls below the lower limit on the aforementioned range, while the handling characteristics of the resulting composition decline when the upper limit on the aforementioned range is exceeded.

The content of component (B) is not specifically limited, but is preferably 0.1 to 500 parts by mass and particularly preferably is 0.1 to 200 parts by mass, in each case per 100 parts by mass of component (A). When component (B) contains phenolic hydroxyl, component (B) is then used in an amount that provides a molar ratio of phenolic hydroxyl in component (B) to total epoxy in the composition of preferably 0.2 to 5, more preferably 0.3 to 2.5, and particularly preferably 0.8 to 1.5. It becomes increasingly difficult to obtain a thorough cure for the resulting composition when the molar ratio of phenolic hydroxyl in component (B) to total epoxy in the composition falls below the lower limit on the given range, while the mechanical properties of the cured product decline substantially at above the upper limit on the given range.

Component (C) is a cure accelerator that accelerates the reaction between the epoxy groups in component (A) and the group in component (B) capable of reacting with the epoxy group, i.e., the curing reaction of the composition. Component (C) can be exemplified by tertiary amine compounds; organometal compounds, e.g., of aluminum or zirconium; organophosphorus compounds such as phosphine; and also by heterocyclic amine compounds, boron complex compounds, organoammonium salts, organosulfonium salts, organoperoxides, and reaction products from the preceding. Examples here are phosphorus compounds such as triphenylphosphine, tributylphosphine, tri(p-methylphenyl)phosphine, tri(nonylphenyl)phosphine, triphenylphosphine/triphenylborate, tetraphenylphosphine/tetraphenylborate, and so forth; tertiary amine compounds such as triethylamine, benzyldimethylamine, α-methylbenzyldimethylamine, 1,8-diazabicyclo[5.4.0]undecene-7, and so forth; and imidazole compounds such as 2-methylimidazole, 2-phenylimidazole, 2-phenyl-4-methylimidazole, and so forth. The use of an encapsulated cure accelerator is preferred because this enables a lengthening of the composition's use time. A commercially available encapsulated cure accelerator is encapsulated amine-type cure accelerator comprising an amine-type cure accelerator incorporated in bisphenol A-type epoxy resin (for example, HX-3088 from Asahi Kasei Corporation).

The content of component (C) is not specifically limited, but preferably is no more than 50 parts by mass, more preferably is 0.01 to 50 parts by mass, and particularly preferably is 0.1 to 5 parts by mass, in each case per 100 parts by mass of component (A). It becomes increasingly difficult to obtain a thorough cure for the resulting composition when the content of component (C) falls below the lower limit on the given range, while the mechanical properties of the cured product decline substantially at above the upper limit on the given range.

Component (D) is a thermally conductive filler that imparts thermal conductivity and flame retardancy to the cured product from the composition. Component (D) can be exemplified by the very finely divided powders of metals such as gold, silver, nickel, copper, and so forth; very finely divided powders afforded by the vapor deposition or plating of a metal, e.g., gold, silver, nickel, copper, and so forth, on the surface of a very finely divided powder of, e.g., ceramic, glass, quartz, organic resin, and so forth; metal compounds such as aluminum oxide, aluminum nitride, zinc oxide, and so forth; and mixtures of two or more of the preceding. Metal powders are preferred for the high thermal conductivity they provide. The metal powders can be exemplified by the powders of gold, silver, copper, aluminum, nickel, palladium, and their alloys, and also by the powders of brass, shape-memory alloys, solder, and mixtures of two or more of the preceding. Silver powder is particularly preferred for the good thermal conductivity, electrical conductivity, and blendability it provides. Its shape is not critical and can be exemplified by ground shapes, spheres, fibrous shapes, columns, flakes, scales, plates, and coils. The particle size is also not critical, but the maximum particle size is generally no more than 200 μm and the average particle size is preferably in the range from 0.001 to 50 μm. Combinations of two or more types of silver powder can also be used.

The content of component (D) is not critical; however, in order to avoid a loss of fluidity by the composition, the content of component (D) is preferably in the range of 100 to 5,000 parts by mass, more preferably in the range of 500 to 5,000 parts by mass, and particularly preferably in the range of 500 to 4,000 parts by mass, in each case per 100 parts by mass of the total of components (A) and (B).

The composition may contain a filler (E) other than component (D) in order to improve the mechanical strength of the cured product afforded by the composition. Component (E) can be exemplified by fibrous fillers such as glass fibers, alumina fibers, alumina/silica ceramic fibers, boron fibers, zirconia fibers, silicon carbide fibers, metal fibers, and so forth; particulate fillers such as fused silica, crystalline silica, precipitated silica, fumed silica, calcined silica, zinc oxide, calcined clay, carbon black, glass beads, alumina, talc, calcium carbonate, clay, aluminum hydroxide, magnesium hydroxide, barium sulfate, aluminum nitride, boron nitride, silicon carbide, aluminum oxide, magnesium oxide, titanium oxide, beryllium oxide, kaolin, mica, zirconia, and so forth; and mixtures of two or more of the preceding. The average particle size and shape of component (E) are not critical, but spherical silica with an average particle size of 0.1 to 40 μm is preferred for the excellent moldability this provides. The content of component (E) is also not critical, but is preferably no greater than 10 parts by mass and particularly preferably is 0.01 to 10 parts by mass, in each case per 100 parts by mass of component (A).

A coupling agent, for example, a silane coupling agent or titanate coupling agent, can also be incorporated in order to bring about good dispersion by component (D) in component (A) or (B) or their mixture and in order to improve the adhesiveness for substrate when the composition undergoes cure. The silane coupling agents can be exemplified by epoxy-functional alkoxysilanes such as 3-glycidoxypropyltrimethoxysilane, 3-glycidoxypropylmethyldiethoxysilane, 2-(3,4-epoxycyclohexyl)ethyltrimethoxysilane, and so forth; amino-functional alkoxysilanes such as N-(2-aminoethyl)-3-aminopropyltrimethoxysilane, 3-aminopropyltriethoxysilane, N-phenyl-3-aminopropyltrimethoxysilane, and so forth; and mercapto-functional alkoxysilanes such as 3-mercaptopropyltrimethoxysilane, and so forth. The titanate coupling agents can be exemplified by isopropoxytitanium tri (isostearate), and so forth. The content of coupling agent is not critical, but is preferably no more than 10 parts by mass and particularly preferably is 0.01 to 10 parts by mass, in each case per 100 parts by mass of component (A).

Other optional components that may be incorporated include alkoxysilanes such as tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, and so forth; and organic solvents such as aliphatic solvents, e.g., hexane, heptane, and so forth; aromatic solvents, e.g., toluene, xylene, and so forth, and ketone solvents, e.g., methyl ethyl ketone, methyl isobutyl ketone, and so forth.

The composition can be prepared by mixing components (A), (B), (C), and (D) and as necessary any optional components to homogeneity. The mixing procedure is not critical and can be exemplified by simultaneously mixing components (A), (B), (C), and (D) and as necessary any optional components; premixing components (A) and (B) and then blending in components (C) and (D) and as necessary any optional components; and premixing components (A), (B), and (D) and as necessary any optional components and then blending in component (C). The device for mixing components (A), (B), (C), and (D) and as necessary any optional components is not critical and can be exemplified by single- and twin-shaft continuous mixers, two-roll mills, Ross Mixers®, Hobart mixers, dental mixers, planetary mixers, and kneader mixers.

The composition, because it exhibits good handling characteristics and cures rapidly, can be used by such methods as transfer molding, injection molding, potting, casting, powder coating, immersion coating, dripping, and so forth. Liquids and pastes are preferred because this enables selection from a variety of use methods, such as potting, screen printing, coating, and so forth; and also supports facile adaptation to low-volume applications.

The cured product of the present invention will now be described in detail.

The cured product of the present invention is characteristically afforded by the cure of a curable silicone composition as described in the preceding.

This cured product is useful as a heat-radiating material between a semiconductor device and a heat sink and as a sealant resin for electrical/electronic components. In particular, this cured product, by virtue of its excellent thermal conductivity, flexibility, and flame retardancy, is very useful as an adhesive between a semiconductor device and a heat sink.

EXAMPLES

The curable silicone composition and cured product therefrom of the present invention will now be described using Practical Examples and Comparative Examples. The properties of the curable silicone compositions and cured products were measured by the following methods.

Viscosity

The viscosity at 25° C. was measured at 2.5 rpm using an E-type viscometer (Digital Viscometer DV-U-E, Model II, from Tokimec Inc.).

Mass-Average Molecular Weight

The mass-average molecular weight was measured on a toluene solution of the organopolysiloxane using gel permeation chromatographic analysis calibrated with polystyrene standards.

Complex Viscoelastic Modulus

The curable silicone composition was filled into a mold that had a cavity with dimensions of width 10 mm×length 50 mm×depth 2 mm. After degassing at 70 mmHg, press curing was carried out for 60 minutes at 150° C. under the pressure of 2.5 MPa. Secondary heating in an oven for 2 hours at 180° C. then gave the cured product test specimen. The complex viscoelastic modulus at 25° C. was measured on this test specimen using an ARES Rheometer (product of Rheometric Scientific Inc.) at a 0.5% torsion, oscillation of 1 Hz, and a temperature rise from −50° C. to 150° C. at a rate of temperature rise of 3° C./minute.

Adhesiveness

A solder resist (developable solder resist, PSR-4000 CC02/CA-40 CC02, from Taiyo Ink Mfg. Co., Ltd.) was coated on a bismaleimide/triazine resin (commonly known as BT resin) substrate, followed by UV drying, exposure, and curing (150° C., 1 hour) to yield a solder resist layer (thickness=50 μm) on the BT substrate; this was employed as an adherend. Glass plate, aluminum plate, nickel plate, and copper plate were also evaluated as adherends. About 1 cm³ of the curable silicone composition was coated on each adherend followed by heating in an oven for 2 hours at 125° C. and then heating in an oven for 2 hours at 180° C. to give the adhesion evaluation test specimen. The cured product was subsequently peeled from the test specimen using a dental spatula and the adhesiveness was visually inspected under a microscope and scored on the following scale:

+=cohesive failure,
Δ=peeling at the interface with a thin layer remaining, and
×=peeling at the interface.

Thermal Conductivity of the Cured Product

The thermal conductivity was determined from the relationship between thickness and thermal resistance using a thermal resistance measurement instrument from Hitachi.

The test specimen was fabricated by heating the curable silicone composition for 2 hours in an oven at 125° C. and then for 2 hours in an oven at 180° C.

Flame Retardancy

A strip-shaped test specimen (thickness 5 mm×width 10 mm×length 50 mm) was fabricated by heating the curable silicone composition in an oven for 2 hours at 125° C. and then for 2 hours in an oven at 180° C. The burning time of the test specimen was measured based on the UL94V-0 vertical burning test set out by Underwriters Laboratories Inc.

Practical Example 1

The following were mixed to give a curable silicone composition: 3.5 parts by mass of an organopolysiloxane (mass-average molecular weight=1,000, viscosity=1,290 mPa·s, epoxy equivalent weight=276) with the following average unit formula:

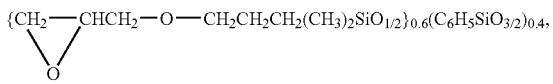

5.5 parts by mass of an organopolysiloxane (viscosity=3,050 mPa·s) with the following formula:

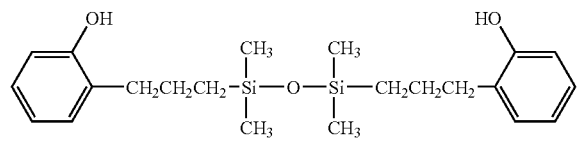

(this amount gave a molar ratio of phenolic hydroxyl in this component to the total epoxy in this composition of 1.0), 1.0 part by mass of an encapsulated amine-type cure accelerator comprising bisphenol A-type epoxy resin containing 40 mass % of amine-type cure accelerator (HX-3088 from Asahi Kasei Corporation), and 90 parts by mass of silver flake (product of Fukuda Metal Foil & Powder Co., Ltd., 50% average particle size=5 to 15 μm, apparent density=2.5 to 4.0 g/cm³). The content of silver flake in this composition was 47.4 volume %. This composition was vacuum defoamed and then evaluated for its viscosity, complex viscoelastic modulus, adhesiveness, and flame retardancy by the methods described above. The results are reported in Table 1.

Practical Example 2

The following were mixed to give a curable silicone composition: 3.5 parts by mass of an organopolysiloxane (mass-average molecular weight=1,000, viscosity=1,290 mPa·s, epoxy equivalent weight=267) with the following average unit formula:

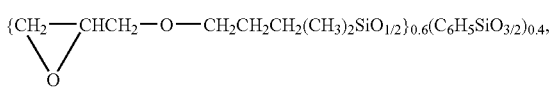

5.5 parts by mass of an organopolysiloxane (viscosity=3,800 mPa·s) with the following formula:

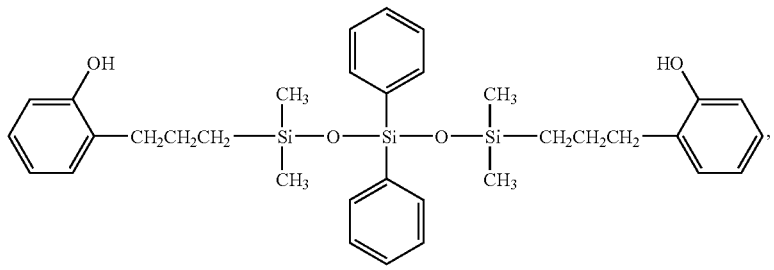

(this amount gave a molar ratio of phenolic hydroxyl in this component to the total epoxy in this composition of 1.0): 1.0 part by mass of an encapsulated amine-type cure accelerator comprising bisphenol A-type epoxy resin containing 40 mass % of amine-type cure accelerator (HX-3088 from Asahi Kasei Corporation), and 90 parts by mass of silver flake (product of Fukuda Metal Foil & Powder Co., Ltd., 50% average particle size=2 to 15 μm, apparent density=2.0 to 3.5 g/cm$^3$). The content of silver flake in this composition was 47.4 volume %. This composition was vacuum defoamed and then evaluated for its viscosity, complex viscoelastic modulus, adhesiveness, and flame retardancy by the methods described above. The results are reported in Table 1.

Comparative Example 1

The following were mixed to give a curable epoxy composition: 5.0 parts by mass of a bisphenol A-type liquid epoxy resin (Epikote 828 from Japan Epoxy Resin Co., Ltd., viscosity=15 mPa·s, epoxy equivalent weight=190), 4.0 parts by mass of a liquid phenol compound (MEH8000H from Meiwa Plastic Industries, Ltd., this amount gave a molar ratio of phenolic hydroxyl in this component to the total epoxy in this composition of 1.0), 1.0 part by mass of an encapsulated amine-type cure accelerator comprising bisphenol A-type epoxy resin containing 40 mass % of amine-type cure accelerator (HX-3088 from Asahi Kasei Corporation), and 90 parts by mass of silver flake (product of Fukuda Metal Foil & Powder Co., Ltd., 50% average particle size=5 to 15 μm, apparent density=2.5 to 4.0 g/cm$^3$). The content of silver flake in this composition was 47.4 volume %. This composition was vacuum defoamed and then evaluated for its viscosity, complex viscoelastic modulus, adhesiveness, and flame retardancy by the methods described above. The results are reported in Table 1.

Comparative Example 2

The following were mixed to give a curable silicone composition: 17.0 parts by mass of an organopolysiloxane (mass-average molecular weight=1,000, viscosity=1,290 mPa·s, epoxy equivalent weight=267) with the following average unit formula:

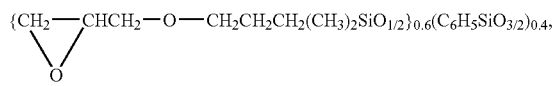

21.0 parts by mass of an organopolysiloxane (viscosity=3,800 mPa·s) with the following formula:

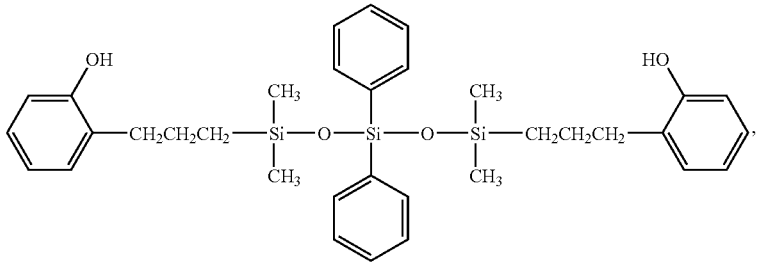

(this amount gave a molar ratio of phenolic hydroxyl in this component to the total epoxy in this composition of 1.0): 1 part by mass of 3-glycidoxypropyltrimethoxysilane, 1.0 part by mass of an encapsulated amine-type cure accelerator comprising bisphenol A-type epoxy resin containing 40 mass % of amine-type cure accelerator (HX-3088 from Asahi Kasei Corporation), and 60 parts by mass of spherical fused silica powder (Admafine from Admatechs Co., Ltd., 50% average particle size=1.3 to 2.0 μm). The content of silica powder in this composition was 57.1 volume %. This composition was vacuum defoamed and then evaluated for its viscosity, complex viscoelastic modulus, adhesiveness, and flame retardancy by the methods described above. The results are reported in Table 1.

Comparative Example 3

The following were mixed to give a curable silicone composition: 0.9 parts by mass of a dimethylvinylsiloxy-end-blocked dimethylpolysiloxane with a viscosity of 20 mPa·s, 6.2 parts by mass of a dimethylvinylsiloxy-endblocked dimethylpolysiloxane with a viscosity of 4 mP·s, 0.8 parts by mass of trimethylsiloxy-endblocked methylhydrogensiloxane-dimethylsiloxane copolymer (silicon-bonded hydrogen atom content=0.75 mass %), 90.5 parts by mass of silver flake (product of Fukuda Metal Foil & Powder Co., Ltd., 50% average particle size=5 to 15 μm, apparent density=2.5 to 4.0 g/cm$^3$), isopropanolic chloroplatinic acid solution (in an amount giving a platinum concentration in this composition of 10 ppm), and 1.0 part by mass of 3-glycidoxypropyltrimethoxysilane. The content of silver flake in this composition was 47.4 volume %. The thermal expansivity and complex viscoelastic modulus were evaluated by the methods described above, with the exception that after vacuum defoaming the composition was cast into a mold and heated for 1 hour in an oven at 150° C. The adhesiveness and flame retardancy were evaluated by the methods described above. The results are reported in Table 1.

Comparative Example 4

The following were mixed to give a curable silicone composition: 20.0 parts by mass of an organopolysiloxane (mass-average molecular weight=1,008, viscosity=1,180 mPa·s, epoxy equivalent weight=371) with the following formula:

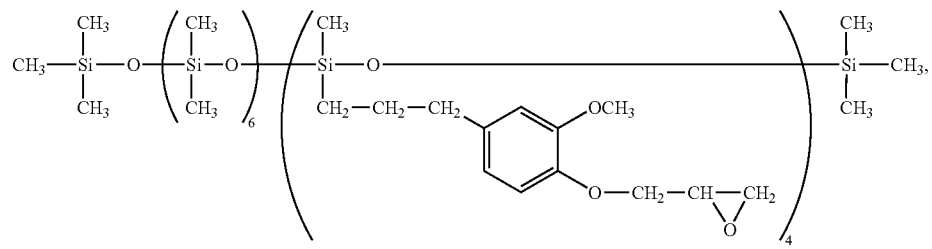

18.0 parts by mass of an organopolysiloxane (viscosity=840 mPa·s) with the following formula:

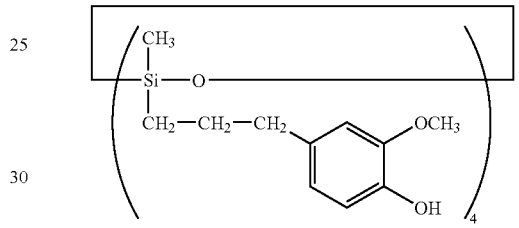

(this amount gave a molar ratio of phenolic hydroxyl in this component to the total epoxy in this composition of 1.0): 1.0 part by mass of an encapsulated amine-type cure accelerator comprising bisphenol A-type epoxy resin containing 40 mass % of amine-type cure accelerator (HX-3088 from Asahi Kasei Corporation), and 60.0 parts by mass of spherical non-crystalline silica (Admafine from Admatechs Co., Ltd., 50% average particle size=1.5 μm). The content of silica powder in this composition was 57.1 volume %. This composition was vacuum defoamed and then evaluated for its viscosity, complex viscoelastic modulus, adhesiveness, and flame retardancy by the methods described above. The results are reported in Table 1.

TABLE 1

| | Example No. | | | | | |
|---|---|---|---|---|---|---|
| | Practical Examples | | Cmparative Eamples | | | |
| | | | Comp. | Comp. | Comp. | Comp. |
| Properties | Pr. Ex. 1 | Pr. Ex. 2 | Ex. 1 | Ex. 2 | Ex. 3 | Ex. 4 |
| Viscosity (Pa · s) | 450 | 500 | >1,000 | 200 | 30 | 30 |
| Complex modulus (MPa) | 500 | 500 | 3,000 | 100 | 10 | 60 |
| Adhesiveness | | | | | | |
| Solder resist | + | + | + | + | × | + |
| Nickel | + | + | + | + | × | + |
| Copper | + | + | + | + | × | + |
| Aluminum | + | + | + | + | + | + |
| Glass | + | + | + | + | + | + |
| Burning time (sec.) | 2 | 3 | entirely burned | entirely burned | entirely burned | entirely burned |
| Thermal conductivity (° C./W) | 4.0 | 4.0 | 4.0 | <0.5 | 2.5 | <0.5 |

INDUSTRIAL APPLICABILITY

The curable silicone composition of the present invention, because it exhibits good handling characteristics, can be used by such methods as transfer molding, injection molding, potting, casting, powder coating, immersion coating, dripping, and so forth. In addition, because the composition cures rapidly, a shorter heating time or a lower thermosetting temperature can be used in its molding process and the internal stresses caused by thermal expansion in the molding process can thereby be reduced. This can prevent component damage when the composition is used as a protective material for small, fragile components and can provide tight adhesion with substrate. Moreover, the composition, because it exhibits good adhesion to difficult-to-adhere substrates such as solder resists, nickel, and copper, is useful, for example, as a sealant, casting agent, coating agent, and adhesive for electrical/electronic components. In particular, cured product provided by the cure of the composition, because it has an excellent thermal conductivity, flexibility, and flame retardancy, is very useful as an adhesive between semiconductor devices and heat sinks.

The invention claimed is:
1. A curable silicone composition comprising:
  (A) an organopolysiloxane that is represented by the average unit formula:

$$(R^1{}_3SiO_{1/2})_a(R^2{}_2SiO_{2/2})_b(R^3SiO_{3/2})_c(SiO_{4/2})_d$$

wherein $R^1$, $R^2$, and $R^3$ are each independently selected from substituted or unsubstituted monovalent hydrocarbon groups and epoxy-functional monovalent organic groups, with the proviso that at least 20 mole % of $R^3$ are aryl groups, and a, b, c, and d are numbers that satisfy $0 \leq a \leq 0.8$, $0 \leq b \leq 0.8$, $0.2 \leq c \leq 0.9$, $0 \leq d < 0.8$, and $a+b+c+d=1$, and that has at least two of the aforementioned epoxy-functional monovalent organic groups in each molecule;
  (B) a compound that has a group capable of reacting with the epoxy group;
  (C) a cure accelerator; and
  (D) a thermally conductive filler selected from the group of metal powder, powder afforded by the vapor deposition or plating of a metal, and combinations thereof;
  wherein component (A) has an epoxy equivalent weight of from 100 to 1,000; and
  wherein component (B) is an organosiloxane represented by the general formula:

$$R^4{}_3SiO(R^4{}_2SiO)_mSiR^4{}_3$$

wherein each $R^4$ is independently selected from substituted or unsubstituted monovalent hydrocarbon groups and phenolic hydroxyl-functional monovalent organic groups, with the proviso that at least two of the groups $R^4$ in the molecule are said phenolic hydroxyl-functional monovalent organic groups, and m is an integer from 0 to 1,000.

2. The curable silicone composition according to claim 1, wherein the epoxy-functional monovalent organic group in component (A) is a glycidoxyalkyl group, epoxycycloalkylalkyl group, or oxiranylalkyl group.

3. The curable silicone composition according to claim 1, wherein the group in component (B) that is capable of reacting with the epoxy group is a phenolic hydroxyl group.

4. The curable silicone composition according to claim 1, wherein the content of component (B) is 0.1 to 500 parts by mass per 100 parts by mass of component (A).

5. The curable silicone composition according to claim 1, wherein component (C) is an encapsulated amine-type cure accelerator.

6. The curable silicone composition according to claim 1, wherein the content of component (C) is 0.01 to 50 parts by mass per 100 parts by mass of component (A).

7. The curable silicone composition according to claim 1, wherein component (D) is silver powder.

8. The curable silicone composition according to claim 1, wherein the content of component (D) is 100 to 5,000 parts by mass per 100 parts by mass of the total of components (A) and (B).

9. The curable silicone composition according to claim 1, that additionally contains a filler (E) other than component (D).

10. A cured product obtained by the cure of a curable silicone composition according to claim 1.

11. The curable silicone composition according to claim 1, wherein at least 50 mole % of $R^3$ in component (A) are aryl groups.

12. The curable silicone composition according to claim 1, wherein at least 80 mole % of $R^3$ in component (A) are aryl groups.

13. The curable silicone composition according to claim 1, wherein component (D) is powder afforded by the vapor deposition or plating of a metal.

14. The curable silicone composition according to claim 1, wherein the content of component (D) is 500 to 5,000 parts by mass per 100 parts by mass of the total of components (A) and (B).

15. The curable composition according to claim 1, wherein a molar ratio of phenolic hydroxyl in component (B) to total epoxy in the composition is of 0.2 to 5.

16. The curable composition according to claim 1, wherein component (A) is a liquid at 25° C.

17. The curable composition according to claim 1, wherein component (A) has an epoxy equivalent weight of from 100 to 700.

* * * * *